Oct. 27, 1936. H. CHRÉTIEN 2,058,415
CONTINUOUS PRINTING MACHINE FOR CINEMATOGRAPHIC FILMS
Filed Feb. 9, 1934 2 Sheets-Sheet 1
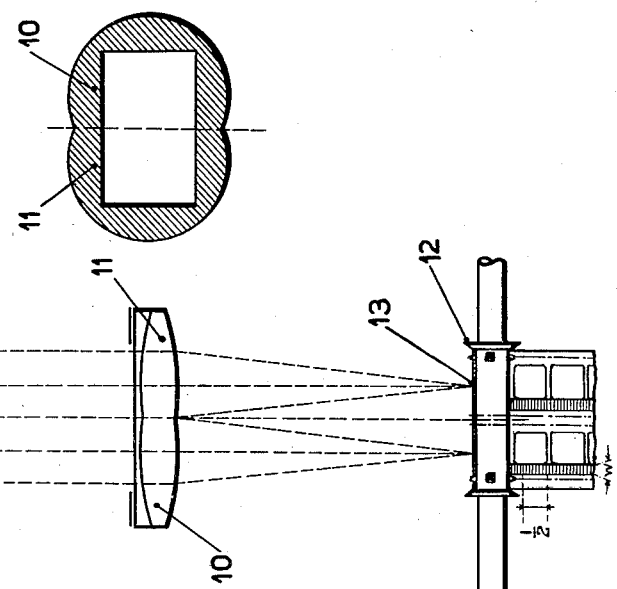
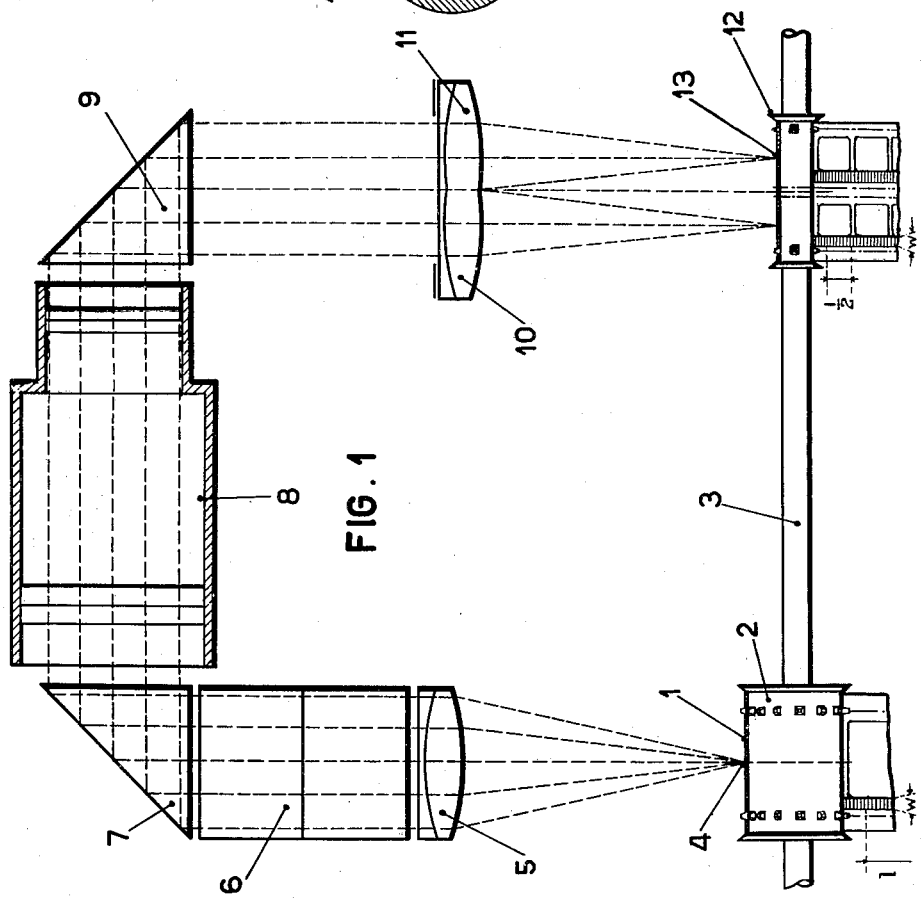
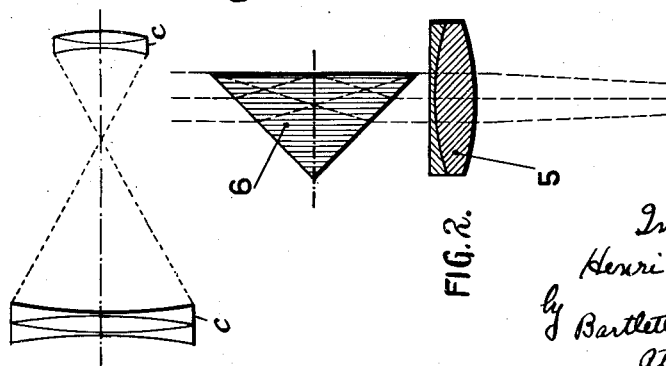
Inventor
Henri Chrétien
by Bartlett, Eyre, Scott & Keel
Attorneys

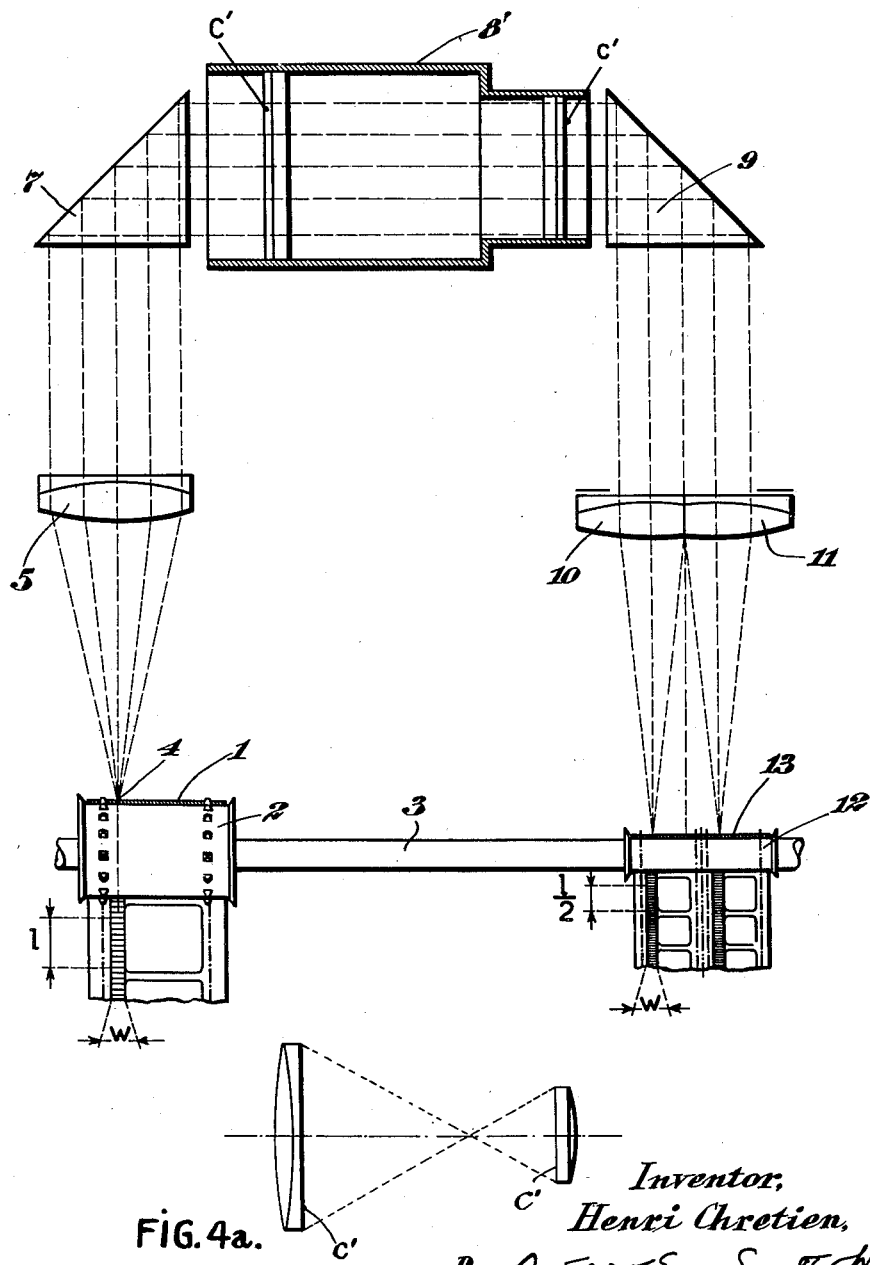

Patented Oct. 27, 1936

2,058,415

UNITED STATES PATENT OFFICE 2,058,415

CONTINUOUS PRINTING MACHINE FOR CINEMATOGRAPHIC FILMS

Henri Chrétien, Saint-Cloud, France

Application February 9, 1934, Serial No. 710,415
In France February 27, 1933

3 Claims. (Cl. 88—24)

The object of the present invention is a photographic printing machine which makes it possible to print a copy of a cinematographic film, anamorphosed or not, or the simultaneous printing of several copies, anamorphosed or not, from one original film, anamorphosis being effected, in case of need, either in the direction in which said film unrolls, or in a direction perpendicular to said unrolling direction. With the printing machine which forms the subject matter of the invention, printing is continuous; in other words, the original and the copy, (or copies), travel through the machine according to a continuous motion and not according to a jerking motion, as is the case in most of the usual cinematographic printing machines.

The objects hereinabove mentioned are obtained by means of the optical device and contrivances hereinafter described.

The printing machine which forms the subject matter of the invention has been represented in diagram form in the attached drawings, and merely as an example, in its application to the simultaneous production of two copies, anamorphosed in the direction in which the original film unrolls as in the case of printing a sound track on a virgin film or on a virgin film on which latent cinematographic pictures have already been impressed, using a film twice the width of that of each of the copies. In these drawings:

Fig. 1 is a plan view, in diagram form, of the optical system of the printing machine and of the driving reels of the films;

Figure 1a is a cross sectional view of the cylindrical lenses forming the anamorphoser shown in Figure 1.

Figure 2 shows the collimator and the Wollaston prism of Figure 1, represented in section through a plane positioned at an angle of 90 degrees relatively to Figure 1 and containing the optical axis of the collimator;

Figure 3 is an elevation, according to the direction of propagation of the luminous rays, of the paired lenses and of the diaphragm of the paired lenses;

Figure 4 is a diagrammatic plan view of another embodiment of the invention in which the reversal of the image is produced by the anamorphoser itself instead of a special reversing device;

Figure 4a is a cross sectional view of the cylindrical lenses shown in Figure 4.

As is shown in the drawings, the original film 1, which passes on drum 2, which is made fast to shaft 3, moves in a direction perpendicular to the plane of Figure 1, and passes through the focal point 4 of a lens or collimator 5. The pencils of parallel rays issuing from said collimator pass through any suitable reversing system, such for example as a Wollaston reversing prism 6 the reflecting surface of which is parallel to the plane of the figure.

On emerging from the reversing prism, the rays are reflected at right angles by a total reflection prism 7 or by a mirror. They then pass through any suitable anamorphosing system 8, such as Brewster's prism anamorphoser, or through a crossed generatrix, cylindrical lens anamorphoser such as Abbe and Rudolph's, but a preferred system is that described in French Patents No. 638,542 of December 9, 1928 and No. 702,975 of September 16, 1930. This anamorphoser offers special advantages in the present case where it is desired to produce, simultaneously, two copies from the same original film, since it makes it possible to use a single anamorphoser for two copies (and even three copies in case of need), if said anamorphoser is positioned in such a way that the generatrices of the cylindrical lenses which constitute it are parallel to the plane containing the optic axes of the lenses to which reference will be made later. When it is intended to make only one copy at a time the direction in which anamorphosis occurs is immaterial; it depends only on the use for which the copy is intended.

On emerging from anamorphoser 8 comprising two cylindrical lenses C and c whose generatrices are parallel to one another, the rays propagated are reflected at right angles by prism 9 (or by a mirror) so that they may again become parallel to the optic axis of collimator 5, then they pass through the two lenses 10 and 11, the focal lengths of which are exactly identical. The number of said lenses is equal to that of the copies which are to be simultaneously printed. The optical axes of said lenses are parallel to the optical axis of collimator 5 and are positioned in the same plane as said axis, all the axes passing along a plane which coincides with that in Figure 1.

Finally a virgin film (or films) 13 on which it is desired to copy the original positioned at 2, moves, in the focal plane which is common to lenses 10 and 11, on a drum 12, provided with teeth, said drum 12 being fixed to shaft 3. Said film (or films) is drawn along at a linear speed equal to that of the pictures, by a toothed drum (12) made fast to the same shaft as drum (2), which actuates the original.

In order to obtain the dimensions of the pictures with great exactness in the direction of the feed, the focussing and the final regulation of the size of the pictures are obtained by the displacement of collimator 5 and of lenses 10 and 11.

Figures 1 and 4 show for example that in the case of the copy of two sound tracks on a virgin film or on a film on which latent pictures of smaller dimensions have been impressed the width $w$ of the sound track remains unchanged but that the length $l$ comprising a given number of sound waves has been reduced by half on the copies made from the original.

In order to obtain the greatest possible resolutive power of the optical system compatible with the smallest dimension possible of reverser 6, it is necessary to position said reverser between prism 9 and lenses 10 and 11 (when it is desired to increase the length of the picture) instead of keeping it in the position in which it is shown in the drawings, said piston corresponding to a reduction in the length of the picture. It is preferable, in all cases, to effect anamorphosis in the direction of the displacement of the film as this makes it possible to employ one anamorphoser only, working under the best optical conditions for obtaining all the copies it may be desired to print simultaneously.

The reversion of the picture transmitted, in the direction in which the film unrolls, can be obtained by any reversing system other than the Wollaston prism, for instance with an Amici prism, a set of Porro prisms or a suitable combination of spherical lenses.

Finally, the same result can also be obtained by suppressing the reversing system and by causing the reversion of the picture by means of the anamorphoser itself (Figure 4). In this case the anamorphoser is made up of two converging systems of cylindrical lenses C' and c' the ratio of the cylindrical focal distances of which is equal to the ratio of anamorphosis it is desired to obtain. These systems are positioned in such a way that their generatrices shall be parallel with one another and that the distance between them is that which makes the anamorphosing system practically afocal.

It is to be understood that, in the foregoing, the word "picture" refers both to the picture of the cinematographic scene and to the sound registration.

Finally it should be noted that, by suppressing the anamorphoser, the printing machine which forms the subject matter of the invention is rendered capable of printing copies having the same dimensions as the original film or dimensions either reduced or increased in the same proportions both in length and in width.

What I claim is:

1. A machine for simultaneously and continuously printing more than one copy from an original film comprising in combination unitary means for driving in spaced relation an original negative film and a virgin film, an optical system for transmitting the luminous rays passing through the negative film to said virgin film to print thereon more than one copy of the negative film but with the images thereof reversed longitudinally of the films and compressed longitudinally of the films, said optical system including a collimator, a pair of reflecting devices for changing the direction of the transmitted rays, optical means for reversing the transmitted images in the direction of motion of the films and for compressing the images in the same direction and more than one lens each adapted to focus the transmitted images upon a different part of said virgin film.

2. A machine according to claim 1 wherein said optical reversing and compressing means comprise a reversing device and an anamorphoser, said reversing device being positioned between said original film and one of said deflecting devices and said anamorphoser being positioned between said deflecting devices.

3. A machine according to claim 1 when said optical reversing and compressing means is an anamorphoser composed of two systems of converging parallel cylindrical lenses, the lens systems having their ratio of focal lengths equal to their ratio of anamorphosis and being so spaced as to make the anamorphoser substantially afocal.

HENRI CHRÉTIEN.